United States Patent [19]

Kupka

[11] Patent Number: 5,403,481
[45] Date of Patent: Apr. 4, 1995

[54] FILTER APPARATUS

[75] Inventor: Martin Kupka, Karlsruhe, Germany

[73] Assignee: Bauko Baukooperation GmbH, Salzburg, Austria

[21] Appl. No.: 59,115

[22] Filed: May 7, 1993

[30] Foreign Application Priority Data

May 12, 1992 [EP] European Pat. Off. ............ 92107999

[51] Int. Cl.⁶ .............................................. B01D 33/37
[52] U.S. Cl. .................................. 210/323.2; 210/330; 210/345
[58] Field of Search ................ 210/321.67, 323.2, 330, 210/331, 332, 345

[56] References Cited

U.S. PATENT DOCUMENTS

| | | | |
|---|---|---|---|
| 376,095 | 1/1888 | Hyatt | 210/330 |
| 2,678,133 | 5/1954 | Thayer et al. | 210/297 |
| 3,583,567 | 6/1971 | Maestrelli | 210/330 |
| 3,821,108 | 6/1974 | Manjikian | 210/332 |
| 4,332,541 | 6/1982 | Anders | 425/197 |

FOREIGN PATENT DOCUMENTS

| | | |
|---|---|---|
| 370118 | 5/1990 | European Pat. Off. . |
| 377054 | 7/1990 | European Pat. Off. . |
| 1557899 | 12/1979 | United Kingdom . |

*Primary Examiner*—Matthew O. Savage
*Attorney, Agent, or Firm*—Brooks Haidt Haffner & Delahunty

[57] ABSTRACT

Figure 6:
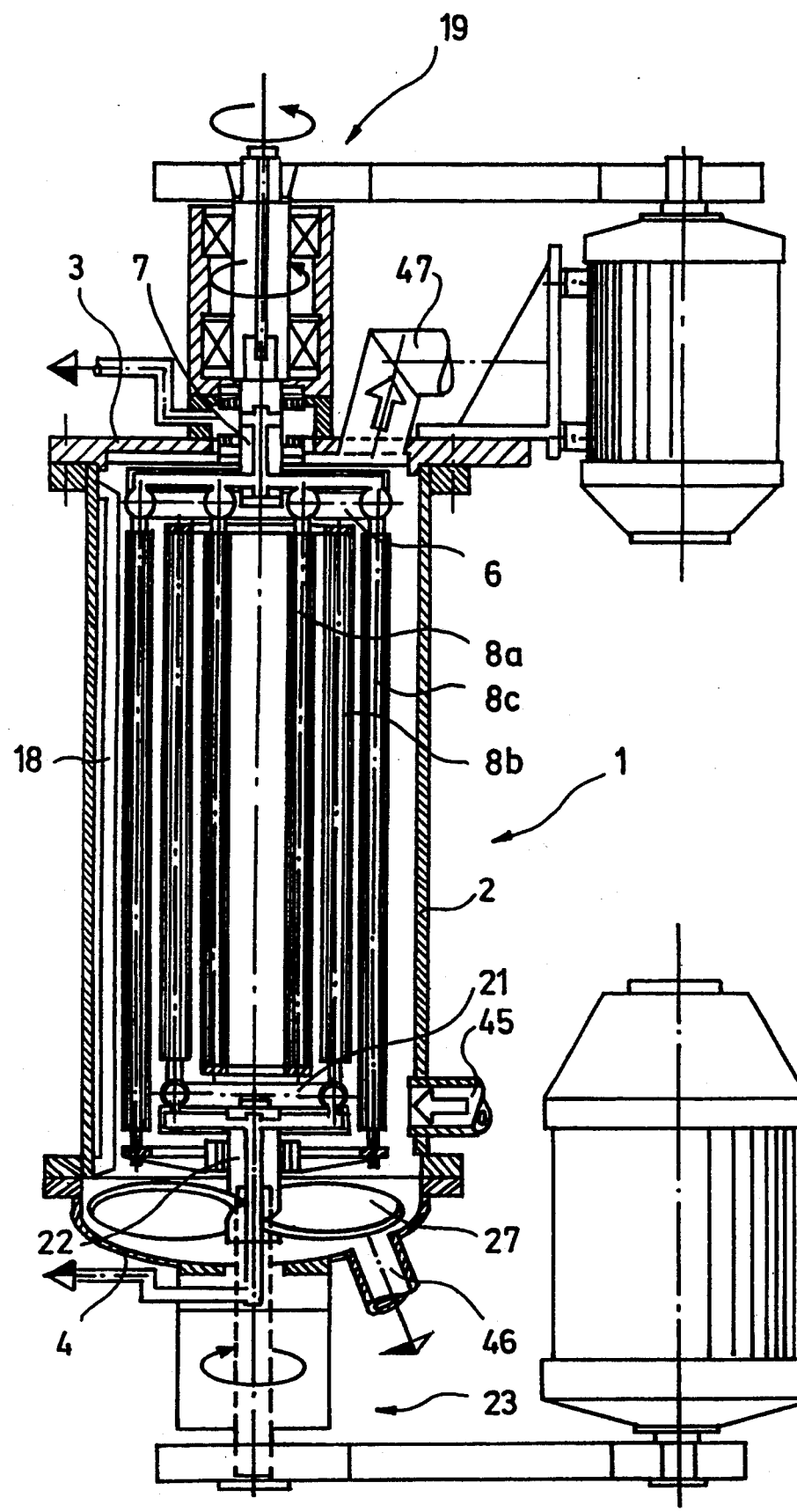

Described is a filter apparatus equipped with tubular filter elements comprising perforated pipe sections with filter media attached to their outer faces. The flow of the liquid to be filtered is directed onto the filter bodies transversely of the pipe section axis. The filter bodies are preferably disposed in a circular array and interconnected to form a cage acting as a rotor revolving within a casing supplied with the liquid to be filtered. A plurality of such cages may be concentrically nested within one another, with neighboring cages revolving in opposite directions. This results in the creation of pulsing flow patterns in the liquid to be filtered, which act to prevent premature clogging of the filter media by sediments thereon (FIG. 6).

3 Claims, 9 Drawing Sheets

FILTER APPARATUS

In the filtration of solids-containing liquids there arises the problem that the solids tend to rapidly accumulate on the filter media, resulting in the build-up of a filter cake whereby the filter medium is clogged and the passage of the liquid through the filter medium is rapidly diminished. For this reason the art has developed the transverse flow filter technique in which a flow component directed parallel to the surface of the filter medium is produced in the sludge to be filtered for preventing the premature accumulation of solid particles on the filter medium.

In the filter press known from EP-B-O 178 389, this so-called transverse flow is produced by means of a rotor disposed between two adjacent filter elements. In another technique employing tubular filter bodies each consisting of a perforate pipe section covered or internally lined with a filter diaphragm, the transverse flow is brought about by causing the sludge to be filtered to flow along the pipe section or through its interior, respectively, so that the filtrate passes through the diaphragm and the perforations of the pipe section. Since as a result of the drainage of the filtrate in this manner the flow rate decreases along the pipe section towards the end thereof, the even in the case of the transverse flow unavoidable accumulation of a filter cake on the filter diaphragm proceeds unevenly along the length of the pipe section, resulting in uneconomical operation. These prejudicial effects are unavoidable even at high flow rates of up to 5 m/sec along the pipe section.

Known from EP-A-O 370 118 is a filter apparatus employing a plurality of concentrically nested cylindrical filter bodies, with adjacent filter bodies rotating in mutually opposite directions, so that a transverse flow is generated adjacent all of the filter bodies. This construction is relatively cumbersome, and does in addition not lend itself to an easy replacement of the filter medium on the filter bodies. The filter bodies require specifically dimensioned filter media (filter cloths or diaphragms) corresponding to their different sizes, with each size being required just once in each filter apparatus, as a result of which the stocking of supplies becomes rather expensive.

It is an object of the invention to provide a filter apparatus in which the premature accumulation of solid particles on the filter bodies from the sludge to be filtered is avoided, and which employs filter bodies of simple construction additionally lending themselves to the replacement of the filter media being readily accomplished.

This object is attained according to the invention by a filter apparatus comprising a cylindrical casing, means for pressure-feeding a liquid to be filtered to said casing, at least one rotor concentrically mounted in said casing and coupled to rotary drive means for rotating it about the axis of said casing, said rotor being composed of a hollow shaft rotatably mounted in an end wall of said casing and having secured thereto a radially extending carrier device, and a plurality of slender tubular filter bodies disposed in at least one closed circular array concentric with the casing axis and extending parallel thereto, with one of the filter body ends secured to said carrier device and the filter body interiors communicating with the interior of said hollow shaft through passages formed in said carrier device, the interior of said hollow shaft communicating on its part with an outlet for filtrate draining from said filter bodies.

According to another embodiment of the invention, the stated object is attained by a filter apparatus comprising a cylindrical casing, means for pressure-feeding a liquid to be filtered to said casing through the lateral wall of said casing, a tubular cylindrical filter body disposed concentrically in said casing and cooperating with the interior wall of said casing to define an annular gap, a plurality of outlet means distributed along the casing axis on the side of the lateral casing wall opposite said pressure feeding means, and outflow means for draining filtrate from the interior of said filter body.

The invention employs the already per se known tubular filter bodies which may be ceramic pipe sections or consist of perforate pipe sections having their outer periphery covered by a hose-shaped filter medium. The manufacture of filter bodies of this type is relatively simple, and the replacement of the filter media thereon is readily accomplished. The filter bodies are commercially available elements, with the resultant favourable effect on the cost of the filter apparatus as a whole.

In contrast to prior art, however, the flow of the liquid to be filtered is not directed in the longitudinal direction of the tubular filter bodies, but rather in the transverse direction thereof as a result of the revolution of the filter bodies transversely of their length about an axis of revolution extending parallel to their length. Since the filter bodies of any group thereof are disposed in a common circular array so as to form, in effect, a "cage" of circular cross-section, the revolution of the filter bodies within the surrounding casing also results in the creation of radial flow components passing through the spaces between any two adjacent filter bodies, so that the liquid to be filtered flows around the filter bodies on all sides thereof. With particular advantage, these radial, outwards directed flow components (centrifugal flow), which are so typical for the invention, are still further enhanced when the filter bodies are arranged in several groups, each group being disposed in one of several concentric circular arrays of different diameter, i.e. when there are several "cages" nested within one another.

In a further improved embodiment the invention provides that one of two adjacent filter body groups is rotated, while the other group concentric therewith is stationary of rotated in the opposite direction. This results in the occurrence in the spaces around the filter bodies of cyclic pressure variations resulting in corresponding cyclic flow rate variations acting to impede the accumulation of solid components of the liquid to be filtered on the filter bodies. It is remarkable that substantially uniform flow conditions are thus created over the length of the filter bodies, so that the unavoidably occurring accumulation of solids on the filter bodies does not show any irregular distribution over the length of the filter bodies.

Figure 1:
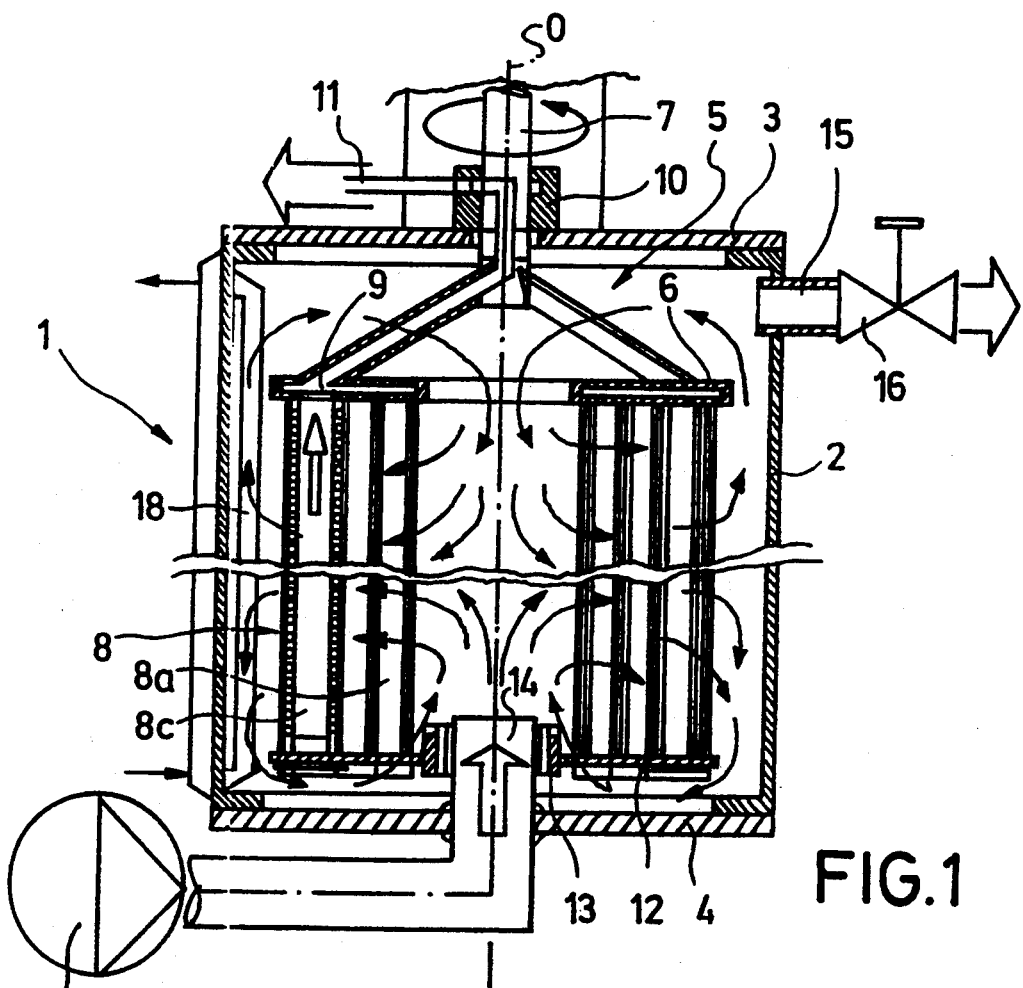
Figure 2:
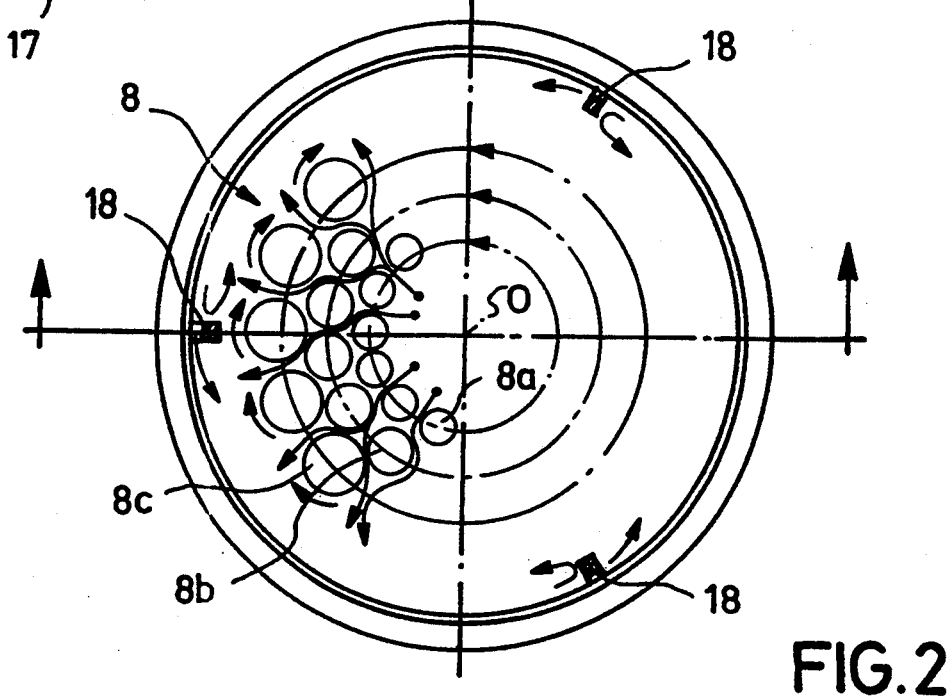
Figure 3:
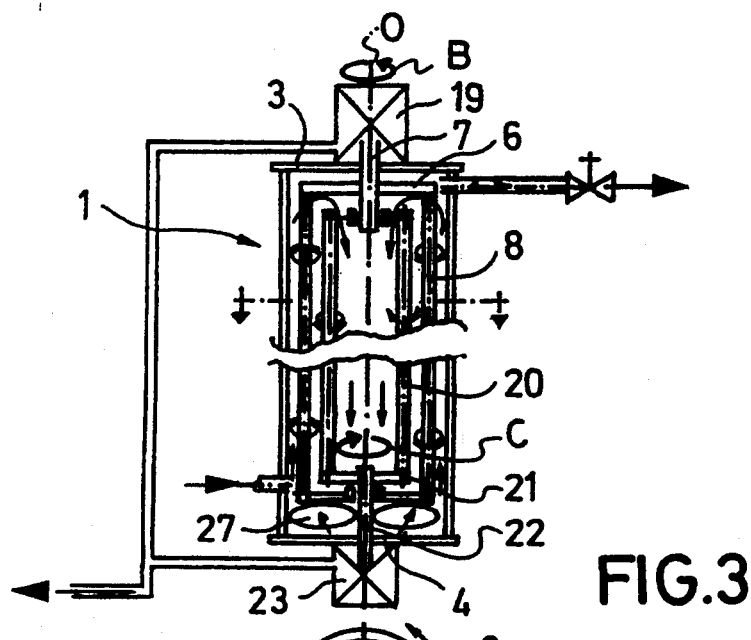
Figure 4:
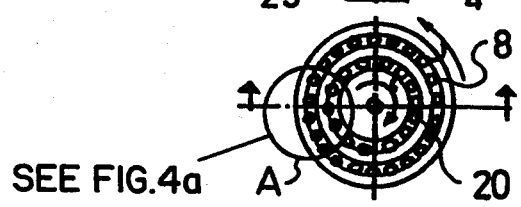
Figure 4A:
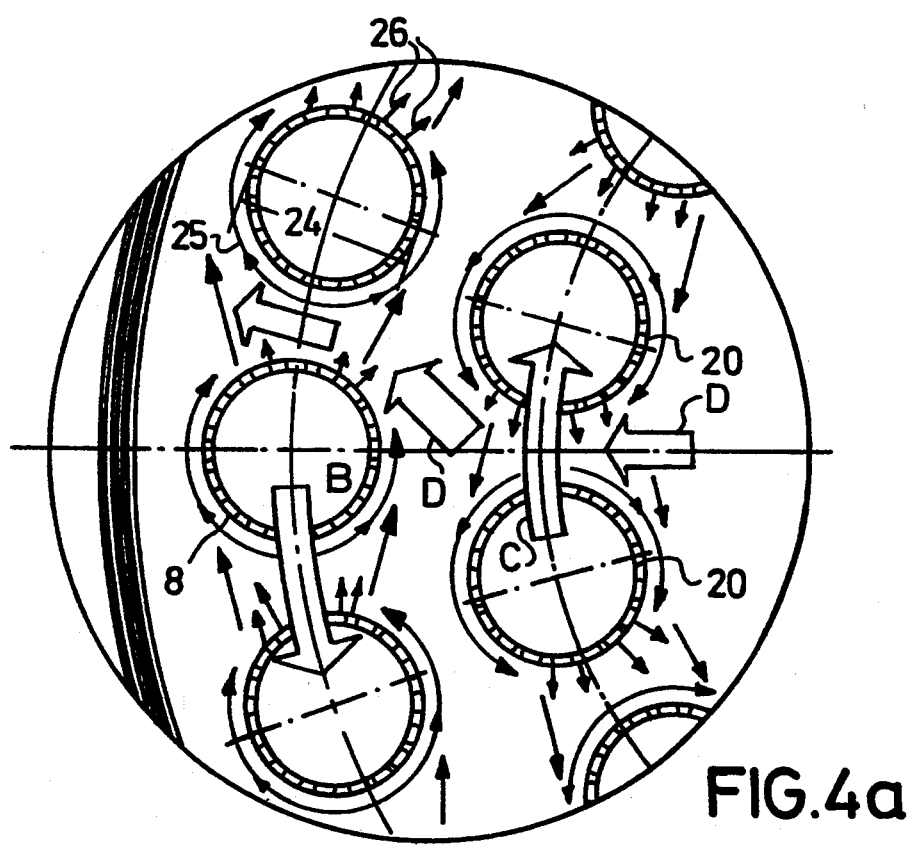
Figure 5:
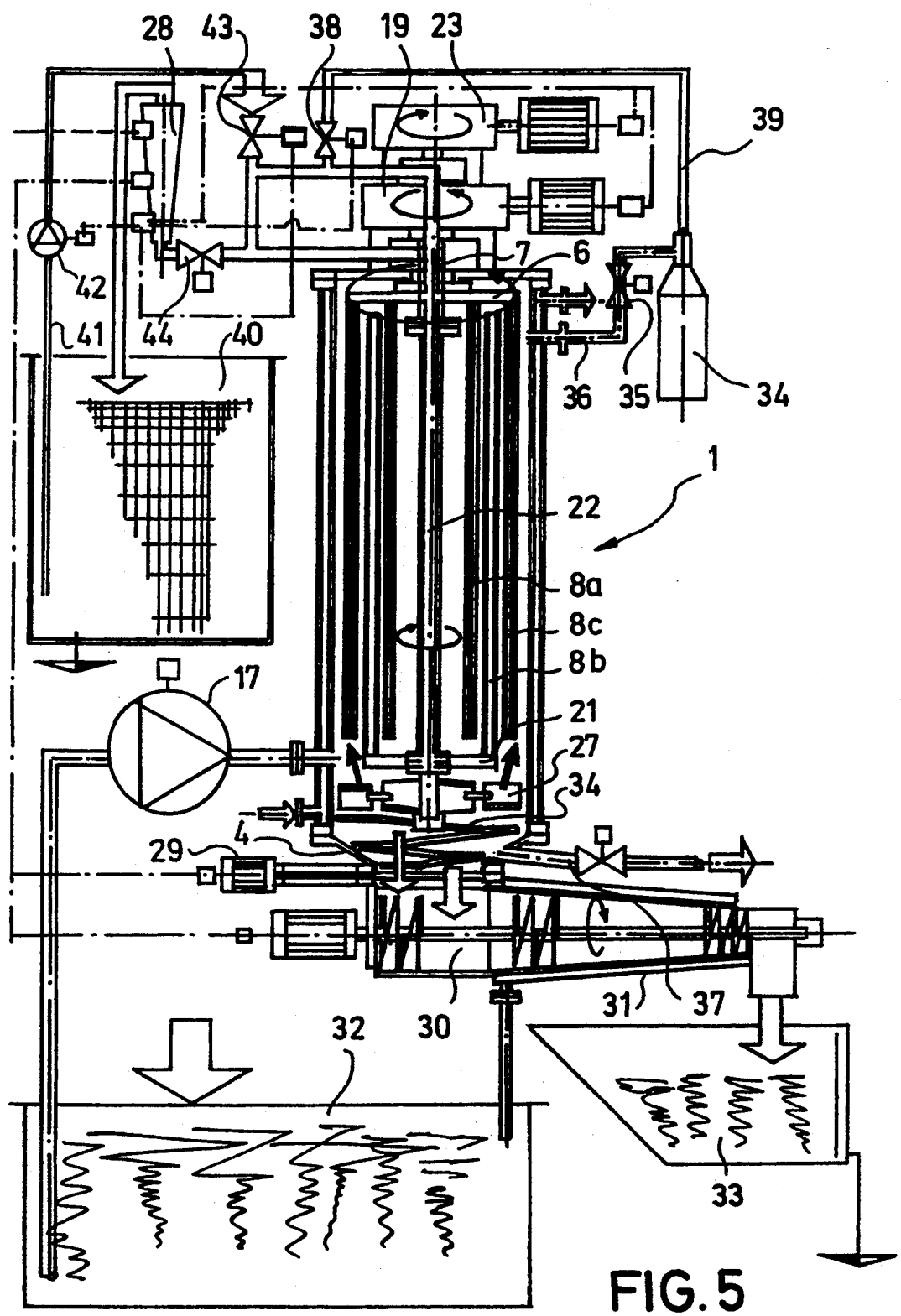
Figure 7:
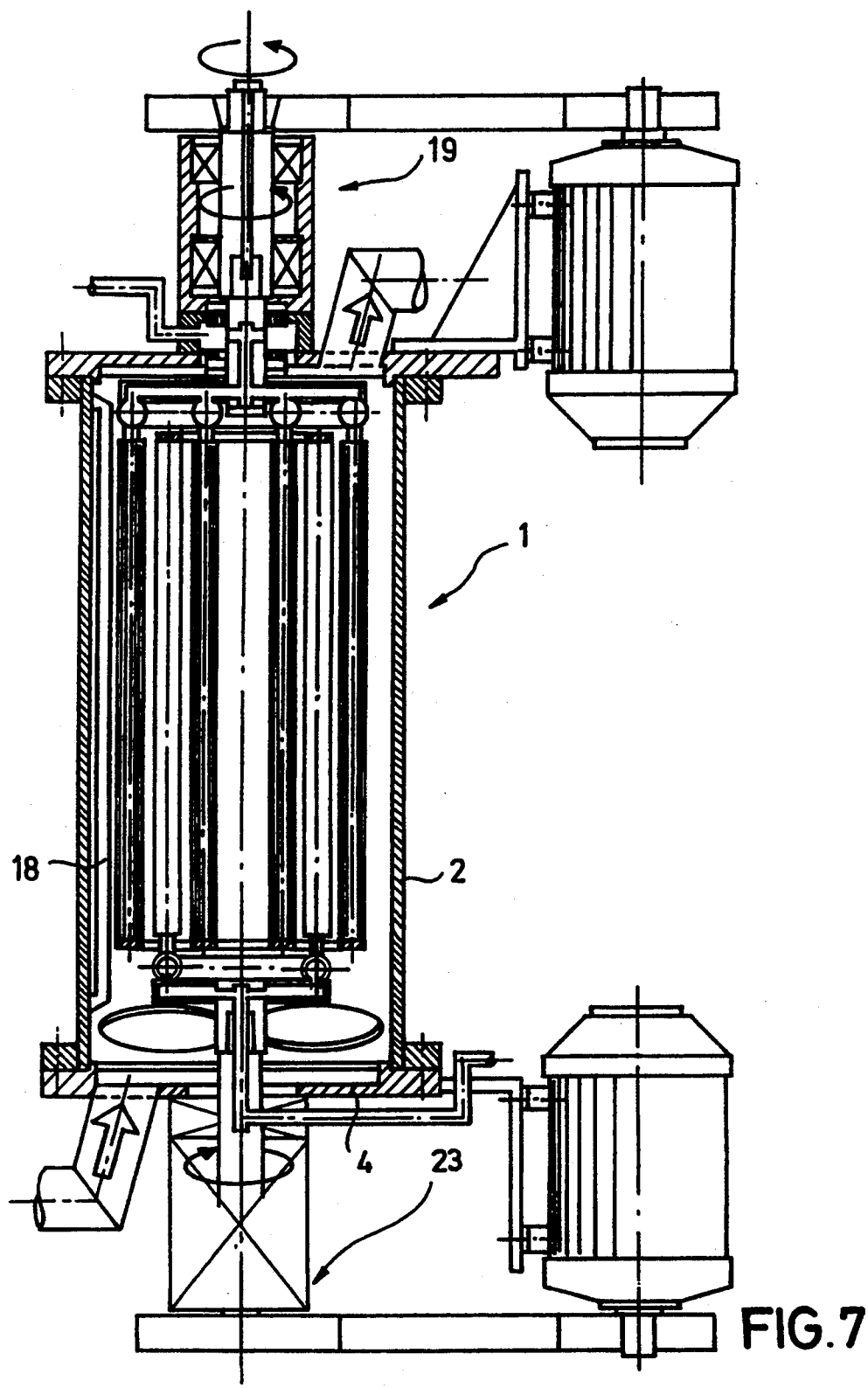
Figure 8:
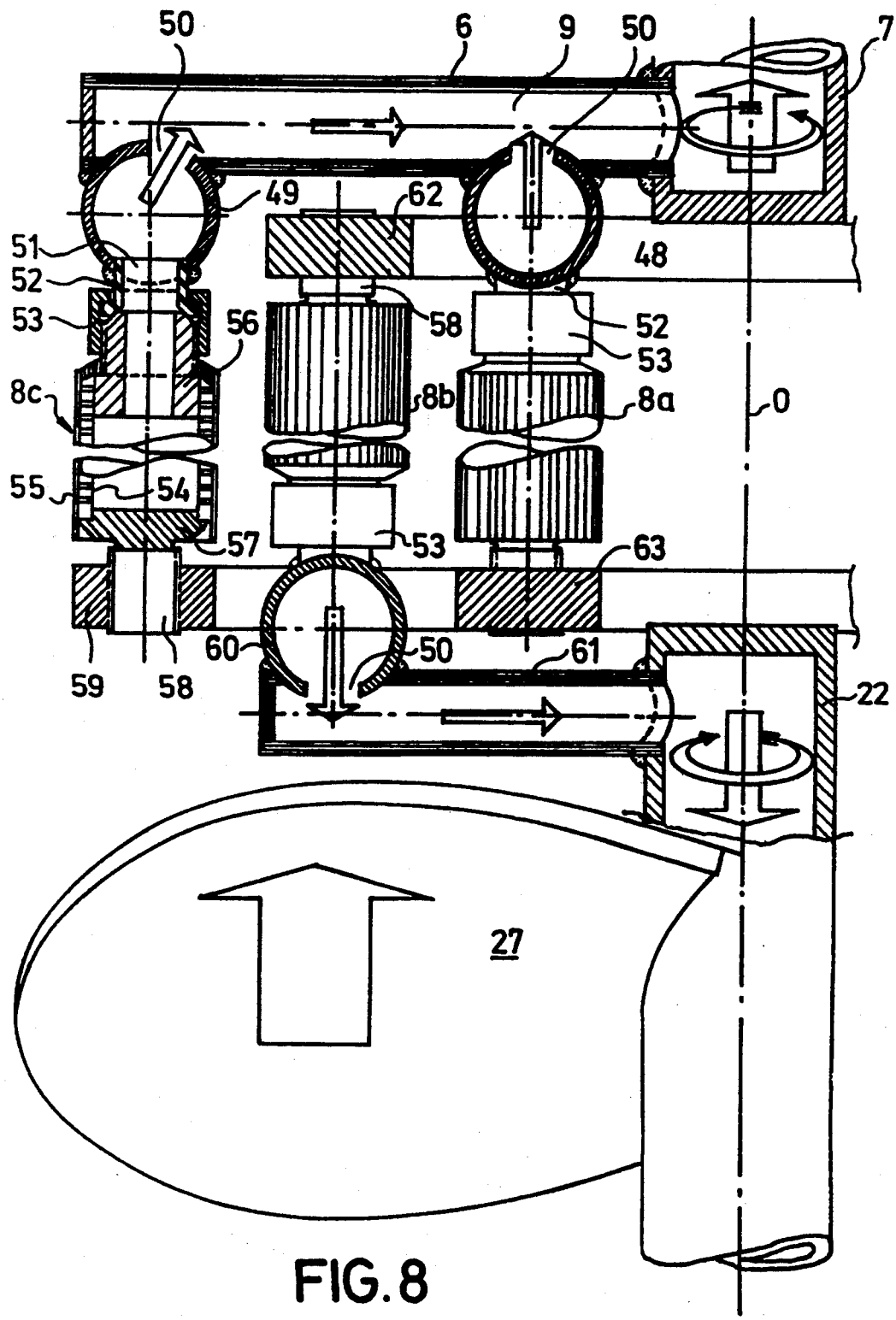
Figure 9:
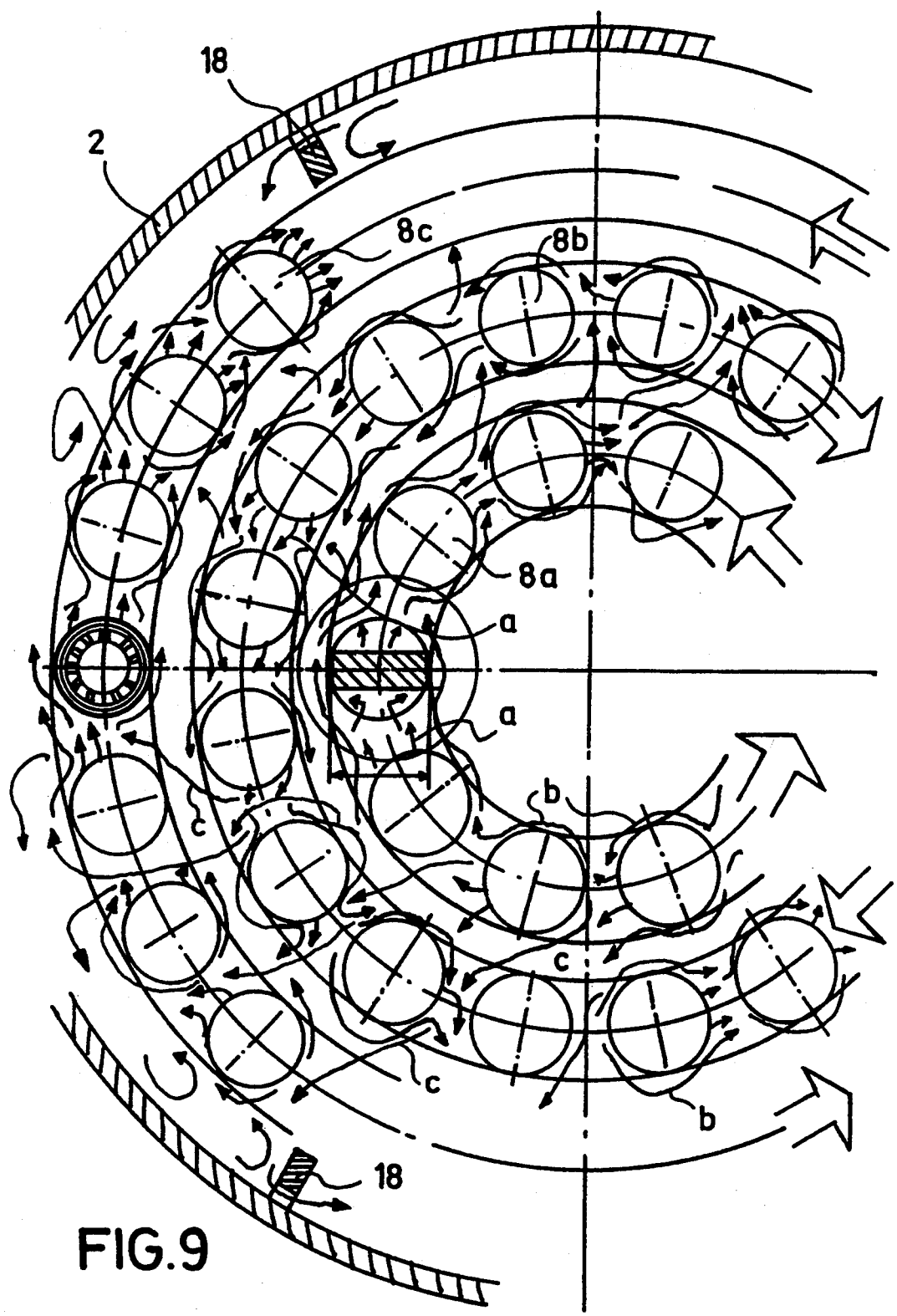
Figure 10:
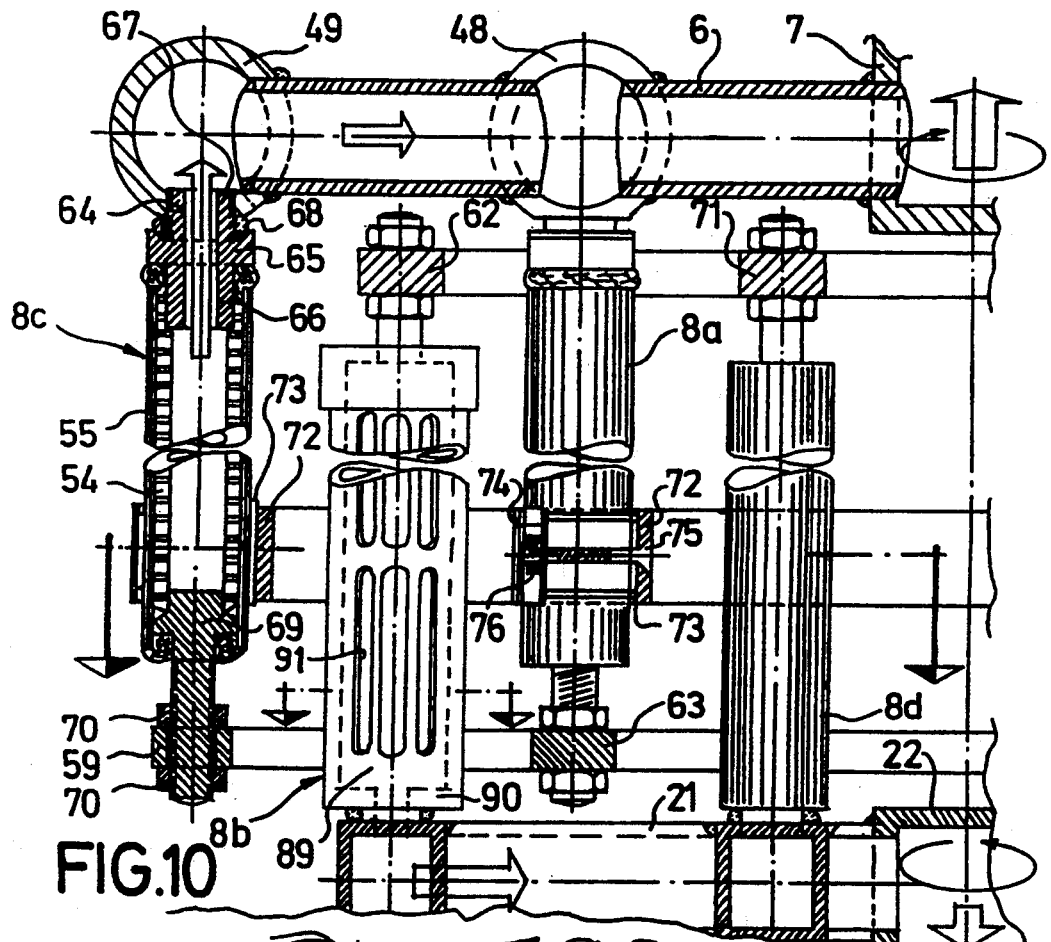
Figure 11:
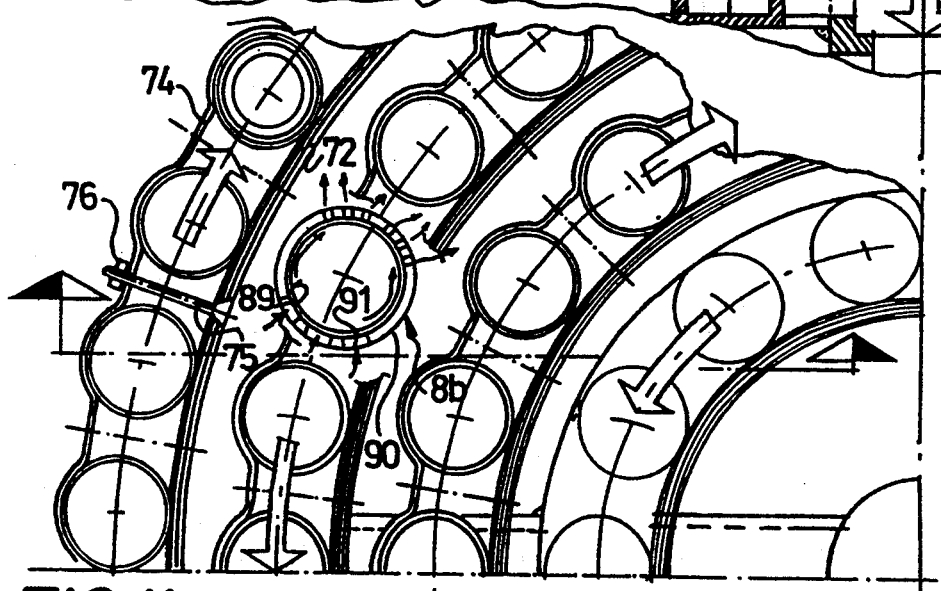
Figure 12:
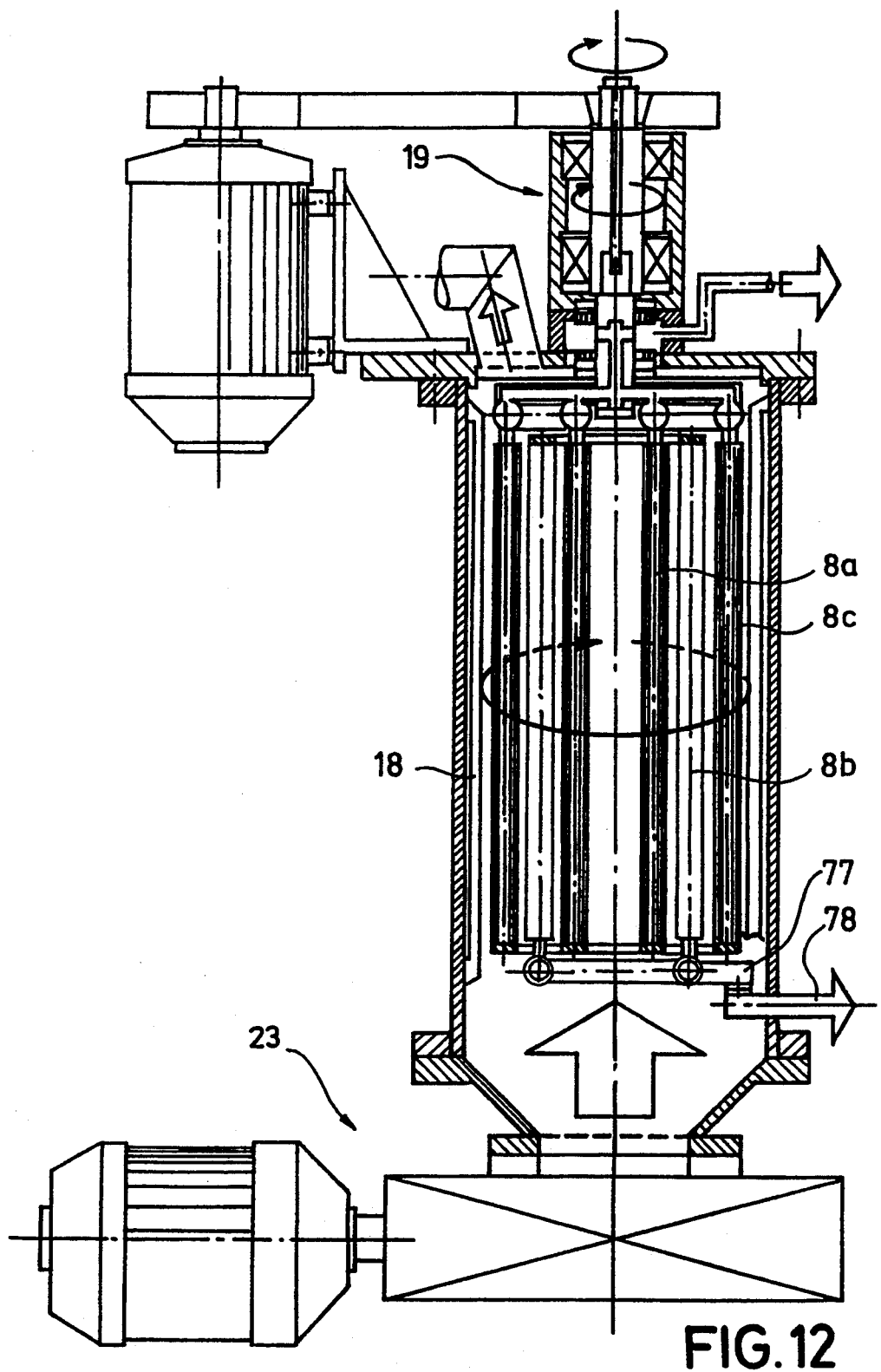

Embodiments of the invention shall now be described by way of example with reference to the accompanying drawings, wherein:

FIG. 1 shows an axially sectioned view of a first embodiment of a filter apparatus according to the invention with three groups of filter bodies, FIG. 2 shows a diagrammatical radially sectioned view of the filter apparatus according to FIG. 1, FIG. 3 shows an axially sectioned view of a second embodiment of a filter apparatus, FIG. 4 shows a diagrammatic radially sectioned view of the filter apparatus according to FIG. 3, FIG. 4a shows an enlarged illustration of the detail A of FIG. 4, FIG. 5 shows an axially sectioned view of a third embodiment of the invention, FIG. 6 shows a modification of the third embodiment, FIG. 7 shows a further modification of the third embodiment, FIG. 8 shows an enlarged view of a detail of the embodiment of FIG. 7, FIG. 9 shows a diagrammatic radially sectioned view of the FIG. 8 embodiment illustrating the flow conditions, FIG. 10 shows parts of a fourth embodiment of the invention, FIG. 11 shows a diagrammatic radially sectioned view of the embodiment of FIG. 10 for illustrating the flow pattern, FIG. 12 shows an axially sectioned view of a fifth embodiment of the invention.

Shown in FIG. 1 is a cylindrical casing 1 having a cylindrical sidewall 2 closed on both ends by respective end walls 3 and 4. Disposed within casing 1 is a rotor generally indicated at 5. Rotor 5 comprises a carrier device 6 extending in substantially radial direction from a hollow shaft 7 sealingly and rotatably mounted in upper casing end wall 3. Rotor 5 further includes a plurality of filter bodies generally designated 8, forming several, in the illustrated example three groups secured to carrier device 6 and extending parallel to the axis 0 of casing 1. Each group of filter bodies is disposed in a circular array concentric with axis 0 of casing 1, the diameter of the filter bodies 8b forming the intermediate array being greater than the diameters of the filter bodies 8a forming the innermost circular array, and smaller than the diameters of the filter bodies 8c forming the outermost circular array. In this manner it is possible to dispose the same number of filter bodies in each of the circular arrays, and to obtain substantially uniform flow passages from the center of casing 1 between filter bodies 8 in the direction towards sidewall 2 of casing 1. The above employed suffixes "a" to "c" merely serve to distinguish between filter bodies 8 belonging to the different groups.

The described arrangement of slender, substantially tubular filter bodies can suitably be subjected to the flow therethrough of liquids to be filtered at pressures of 0.1 to 80 bar. The high flow rates obtainable in operation by the revolution of the filter bodies render the use of pre-filtering devices unnecessary, even in the case of microporous filter diaphragms being employed. In this manner it is for the first time possible to perform a one-stage filtration of liquids which may contain a considerable amount of solid components. A further possible application lies in the field of micro-filtration.

Each filter body 8 has one of its ends secured to carrier device 6, the latter being formed with internal passages 9 communicating with the interior of hollow shaft 7. Shaft 7 is surrounded by a sealed housing 10 equipped with sliding seal rings and having an outlet 11 extending therefrom. Hollow shaft 7 has at least one transverse bore by way of which the interior of hollow shaft 7 communicates with the interior of sealed housing 10. The other ends of filter bodies 8 are secured to a common carrier disc 12 formed with perforations between filter bodies 8 so as to permit the liquid flow to pass through carrier disc 12. At its center carrier disc 12 is provided with a hub 13 mounted on a pipe socket 14 extending through lower casing end wall 4. Pipe socket 14 is provided for pressure-feeding the liquid to be filtered to the interior of casing 1.

Adjacent its upper end, sidewall 2 of casing 1 is formed with an outlet 15 adapted to be closed by a throttle valve 16. From outlet 15, a (not shown) return conduit leads to a buffer receptacle whence a pump 17 supplies the liquid to be filtered to pipe socket 14.

It is to be noted that, for facilitating access to the interior of casing 1, at least one of the end walls, preferably the upper end wall 3, is releasably connected to sidewall 2.

Hollow shaft 7 is adapted to be rotated by a rotary drive mechanism not shown in FIG. 1. In operation, a liquid to be filtered is pressure-fed to casing 1 by means of pump 17. At the same time rotor 5 is rotated, resulting in the occurrence of transverse flows adjacent filter bodies 8, while the rotation of rotor 5 causes the appearance of a radial flow component directed outwards from the center. In order to avoid that the liquid to be filtered is too strongly entrained by the rotation of rotor 5, sidewall 2 has a number of flow spoilers secured to its inner face in the shape of rails extending parallel to filter bodies 8 in the axial direction.

The above mentioned radial flow component results, as shown in FIG. 2, in the occurrence of liquid flows from the center outwards through the spaces between filter bodies 8a, 8b and 8c. This results in a flow around filter bodies 8 transversely of their length. The filtered liquid (filtrate) entering the tubular filter bodies through the filter media and the perforations proceeds through passages 9 of carrier device 6, the interior of hollow shaft 7 and sealed housing 10 to outlet 11. To avoid excessive thickening of the liquid to be filtered, valve 16 may be partially opened, resulting in a continuous flow through casing 1 of the liquid to be filtered, with a suitable proportion of filtrate being continuously extracted therefrom. This evidently results in a steady increase of the solids concentration in the mentioned buffer receptacle of the liquid to be filtered. As the liquid to be filtered attains a preselected density or solids concentration, the resulting sludge may be processed in any other suitable manner.

The liquid flow about the filter surfaces of the filter bodies in the apparatus according to the invention is of a high intensity and thus permits sludges of relatively high solids concentration to be processed without causing the flow rate of the filtrate to be reduced by the accumulation of solids on the filter media. It is thus readily possible to attain flow rates of 10 m/sec and above, which is favourable in view of preventing the accumulation of solids on the filter media.

In the case of the filter bodies being provided with particular filter media which may tend to become gradually clogged when the liquid to be filtered contains colloidal components, the performance of the filter apparatus can be satisfactorily maintained by a reverse flushing operation and regeneration of the capillaries of the filter medium. This may be carried out by reversing the flow of the filtrate with rotor 5 stationary or in operation. The filtrate thus returned to the interior of the filter bodies creates an inverted pressure drop over the filter media, to which purpose it is not even necessary to reduce the filtering pressure within the casing as long as the pressure of the filtrate backfeed is higher than the feed pressure of the liquid to be filtered. This pressure difference may for instance be as low as 0.5 bar. In the course of this reverse flow flushing operation, the hose-shaped filter media are expanded in accordance with their expansion capability, this expansion advantageously resulting in a dilation of the pores to thus improve the efficiency of the flushing operation.

FIG. 3 shows a second embodiment of the invention, comprising two groups of filter bodies disposed in a common casing 1 and revolving in opposite directions about casing axis 0. The first group of filter bodies 8 is secured to a first carrier device 6 itself secured to a first hollow shaft 7 adapted to be rotated by a first drive source, for instance an electric motor 19. Hollow shaft 7 extends through a first casing end wall 3.

The second group of filter bodies 20 is secured to a second carrier device 21 itself secured to a second hollow shaft 22 extending through the second casing end wall 4 and adapted to be rotated by a second electric motor 23. As shown, the ends of filter bodies 8 and 20 facing away from carrier devices 6 and 21, respectively, may be secured to support discs mounted by means of hubs on extensions of the respective hollow shafts 7 and 22. The flow paths from the interior of filter bodies 20 to second hollow shaft 22 are similar to what has been described with reference to the first example.

FIG. 4 shows a radially sectioned view illustrating the arrangement of filter bodies 8 and 20 and their revolution in opposite directions about casing axis 0. The flow conditions resulting from these oppositely directed revolutions are shown as an enlarged detail A in FIG. 4a and shall be discussed in the following.

Shown in FIG. 4a is an outer group of filter bodies 8 disposed in a circular array and revolving counterclockwise as indicated by an arrow B. A second group of filter bodies 20 is disposed in another circular array concentric with the array of filter bodies 8 and of a smaller diameter. This second group of filter bodies 20 revolves clockwise about the casing axis, as indicated by an arrow C. As a result, the filter bodies 8 and 20 pass each other during their revolutions. The distance between the two groups of filter bodies is about the same as the distance between the filter bodies within one group, as shown. In the example shown, the filter bodies 8 and 20 are of the same diameter, although their diameters might also be different from one another. A uniform diameter is more economical, however, with regard to maintaining filter media supplies.

In operation, the counterclockwise revolution of filter bodies 8 results in a strong flow about each filter body 8 as indicated by arrows 25, and in accordance with the projection area 24 of the filter body offered to the liquid to be filtered, and depending on the revolving speed of the filter bodies 8 and energy input. The flow 25 mainly impinges on the forwards facing surface area of the filter bodies in the direction of their revolution, and is of uniform strength over the full length of the filter body 8, resulting in a considerably improved performance a compared to conventional filter apparatus with axial flow through tubular filter bodies.

At the surface area of filter body 8 facing rearwards with regard to the direction of revolutions, that is, on the lee-side, there occurs a pressure drop of a magnitude increasing in accordance with the revolving speed. This reduced pressure acts in the direction of arrows 26 and is effective to prevent the accumulation of solids on the lee-side of the filter body 8. While on the "luff-side" of the filter body the flow 25 therearound caused by its movement transversely of its length thus prevents the accumulation of solids due to the transverse flow pattern, the accumulation of solids on the lee-side is prevented by the "wake effect".

The same applies correspondingly to the second group of filter bodies 20, with the only difference that its revolution is directed in the opposite sense. A discussion of the above described effects may therefore be omitted.

The rotary speeds of the oppositely revolving filter bodies are added to one another as regards the flow components caused by the revolutions, particularly the centrifugal flow components and the phenomenon to be described:

Shown in FIG. 4a is a phenomenon brought about in the liquid to be filtered by the oppositely directed revolutions of filter bodies 8 and 20. In the course of their revolutions, filter bodies 8 and 20 alternatingly approach, and move away from, one another. As a result, the width of the gap existing between two oppositely revolving filter bodies 8 and 20 is at first decreased and subsequently enlarged. This causes pulsating pressure variations to occur in the liquid to be filtered in the space between filter bodies 8 and 20, resulting in the generation of pulsating flows directed transversely of the direction of revolution and effective to impede the accumulation of solids on filter bodies 8 and 20. The intensity of these transversely directed flow phenomena rises with increasing revolving speeds. The revolution of the filter bodies about casing axis 0 additionally gives rise to a radially outwards directed flow component D in the liquid to be filtered, as a result of centrifugal effects.

As further shown in FIG. 3, second hollow shaft 22 has an agitator 27 connected thereto which acts to produce a homogenizing vertical flow in the liquid to be filtered, this additional flow component additionally contributing to keeping the filter surfaces free of solids accumulations.

The mentioned mounting of the support discs for retaining the ends of filter bodies 8 and 20 on the hollow shafts counteracts an otherwise possible ouwards bending of the filter bodies under dynamic loads, to thus permit the employ of long and slender filter bodies having a large filter surface area.

Diagrammatically shown in FIG. 5 is a filter installation comprising a third embodiment of the invention. Contained in a casing 1 is a first carrier device including a hollow carrier 6 mounted on a first hollow shaft 7 and having two groups of filter bodies 8a and 8c secured thereto in two mutually concentric circular arrays. First hollow shaft 7 is adapted to be rotated by a first drive mechanism 19. Extending through first hollow shaft 7 is a second hollow shaft 22 adapted to be rotated by a second drive mechanism 23 disposed above first drive mechanism 19. Second hollow shaft 22 extends to a location just short of the opposite end of casing 1 and mounts a carrier device 21 having secured thereto a third group of filter bodies 8b in a circular array concentric with, and located between, the circular arrays of the filter bodies 8a and 8c of the other two groups. The two drive mechanisms 19 and 23 are operable to rotate hollow shafts 7 and 22, respectively, in mutually opposite directions. This results in the creation in the liquid to be filtered and contained in casing 1 of the flow conditions illustrated in FIG. 4a between the filter bodies revolving in opposite directions. At its lower end, second hollow shaft 22 carries an agitator 27 acting to create an axial flow component in the liquid to be filtered in a similar manner as described with reference to FIG. 3.

Likewise as in the embodiment according to FIG. 3, the hollow shafts are connected to outlet means for draining the filtrate from filter bodies 8a to 8c. The liquid to be filtered is pressure-fed to casing 1 by means of a pump 17.

This filter installation is useful for performing the following process:

The liquid to be filtered is fed to casing 1. The filtrate is extracted from the liquid to be filtered by filter bodies 8a to 8c. When the filter sludge attains a determined solids concentration, which may be derived from measuring the filtrate output volume by means of a flow meter 28 downstream of the filtrate outlet, a slide valve 29 provided at the lower end wall 4 of casing 1 is operated to open a gap of a defined width. This permits a defined amount of the concentrate to enter a worm extruder press 30 connected to lower end wall 4 and to have its liquid content squeezed out therefrom. The thus extracted, relatively "dirty" filtrate flows along a return pipe 31 back into a reservoir 32 whence the liquid to be filtered is fed to the filter apparatus. The pressure-drained solids from worm extruder press 30 are continuously discharged into a disposal receptacle 33. An agitator 34 provided at the lower end of second hollow shaft 22 acts to assist the transfer through the mentioned gap into worm extruder press 30 of the concentrate produced by the operation of the filter apparatus.

According to a second process step, drive mechanisms 19 and 23 are stopped in response to a determined sludge concentration in the filter apparatus being attained. Subsequently the pressure within casing 1 is continuously increased by means of pump 17. This causes a rapid accumulation of solids on filter bodies 8a to 8c in view of the fact that there is no longer any transverse flow. As soon as the accumulation of solids has reduced the permeability of the filter media on the filter bodies to such a degree that the filtrate flow meter 28 is no longer able to detect any filtrate flow, a valve 35 is activated to open a pneumatic pressure source 34 (e.g. a gas cylinder). Valve 35 is connected to casing 1 by a pressure conduit 36. At the same time a residue discharge outlet 37 provided in lower end wall 4 is opened, and the gas flow originating from pneumatic pressure source 34 acts to blow the fluid residues off the solids accumulations on the filter bodies. Water-permeable sediments release their moisture content through the pores of the filter media and are thereby dried. Air-permeable sediments are blown dry. The pneumatic pressure is effective to condense the sediments on the filter media to the form of compact filter cakes. For removing these cakes from the filter bodies, a valve 38 disposed in a pressure conduit 39 connecting pneumatic pressure source 34 to hollow shafts 7 and 22 is subsequently opened for fractions of a second. The filter media are thus subjected to the action of an inversely directed pressure pulse and thereby expanded, causing the filter cakes to burst and to drop down onto lower end wall 4. The agitator 34 subsequently acts to convey the dry sediments towards the already mentioned worm extruder press 30.

It is furthermore possible to back-flush the filter media. To this purpose there is provided a conduit 41 leading from a filtrate collector vessel 40 to hollow shafts 7 and 22 and having a pump 42 and a valve 43 disposed therein. After the conduit leading to filtrate flow meter 28 has been shut off by means of a valve 44, the filtrate taken from collector vessel 40 by means of pump 42 is pressure-fed to the down-stream side of the filter media on filter bodies 8a to 8c.

FIG. 6 shows a filter apparatus similar to the one depicted in FIG. 5, with filter bodies 8a, 8c and 8b, respectively, revolving in opposite directions. In this embodiment hollow shafts 7 and 22 extend through upper and lower end walls 3 and 4, respectively, of casing 1. Drive mechanisms 19 and 23 are accordingly disposed adjacent opposite ends of casing 1. The liquid to be filtered is supplied through an inlet 45 adjacent the lower end of casing sidewall 2. Lower end wall 4 is provided with an outlet 46 for the residue concentrate. For the operation of the apparatus in the flow-through mode, upper end wall 3 is provided with an outlet 47 for the circulation of the liquid to be filtered. In the example shown, lower casing end wall 4 is of slightly cambered configuration to provide optimum flow characteristics in cooperation with an agitator 27 mounted on second hollow shaft 22. The drive mechanisms 19 and 23 are designed for causing filter bodies 8a, 8c and 8b, respectively, to revolve in opposite directions.

The embodiment according to FIG. 7 is substantially similar to the one according to FIG. 6, although the liquid to be filtered is in this case supplied through lower casing end wall 4, which is of planar configuration in the example shown.

It is to be noted that in the embodiments according to FIGS. 6 and 7, the casing sidewall 2 has its inner face provided with flow spoilers 18 extending parallel to the casing axis.

FIG. 8 shows details of a first embodiment of filter bodies and associated mountings in the case of a filter apparatus having groups of filter bodies revolving in opposite directions. As shown in FIG. 8, a first hollow shaft 7 has mounted thereon a tubular radial arm 6 forming part of a first carrier device, with its interior 9 communicating with the interior of hollow shaft 7. Secured to radial arm 6 in concentric relation to the axis of rotation of hollow shaft 7, itself coinciding with the casing axis 0, are two annular pipes 48 and 49 defining circles of different diameters and having filter bodies 8a and 8c of a first and a third group, respectively, connected thereto. Annular pipes 48 and 49 are formed with openings 50 for communication of their interiors with the interior of radial arm 6. At all of the locations whereat a filter body is connected to an annular pipe, the latter is formed with a bore 51, with a connector socket 52 secured thereto and carrying a sleeve nut 53.

A filter body comprises a perforated pipe section 54 carrying a filter medium 55 on its outer side. Inserted into one end of perforated pipe section 54 is a bushing 56 having one end projecting from pipe 54 and provided with screw threads for sleeve nut 53 to be screwed thereonto. Secured to the other end of pipe section 54 is a closure plug 57 having a threaded stud 58 projecting therefrom. Threaded stud 58 is screwed into a threaded bore formed in a carrier ring 59 common to all filter bodies 8c. The construction and arrangement of filter bodies 8a is identical to what has been said with reference to filter bodies 8c. The same applies to filter bodies 8b, except that these are secured to an annular pipe 60 having a radius lying between those of the circles defined by annular pipes 48 and 49. This annular pipe 60 is mounted on a tubular radial arm 61 itself secured to second hollow shaft 22. The interior of annular pipe 60 communicates through an opening with the interior of radial arm 61 itself being in communication with the interior of hollow shaft 22. Threaded stud 58 of filter body 8b is screwed into a threaded bore formed in a second carrier ring 62 extending between annular pipes 48 and 49.

Removal of the filter bodies merely requires sleeve nuts 53 to be released, whereupon the filter bodies can be unscrewed from their respective carrier rings 59 and 62. It is to be noted that for filter bodies 8a there is provided another carrier ring 63 which is different from carrier ring 59.

Diagrammatically shown in a radially sectioned view in FIG. 9 are the flow conditions resulting from the revolution of filter bodies 8a, 8c and 8b, respectively, in opposite directions within the liquid to be filtered. As shown in this figure, the inner group of filter bodies 8a revolves counterclockwise, the intermediate group of filter bodies 8b revolves clockwise, and the outer group of filter bodies 8c again revolves counterclockwise closely adjacent flow spoilers 18 secured to the inner face of casing sidewall 2. As a result of its revolving displacement, each filter body offers to the surrounding liquid an effective cross-sectional area determined by its diameter as illustrated in FIG. 9 by way of example with reference to one of filter bodies 8a. The diagram shows flow components a directed straight onto the sides of the filter bodies facing forward in the direction of their revolution, flow components b directed past the filter bodies in opposition to their direction of revolution, and generally radial flow components c directed outwards through the spaces between the filter bodies. These manifold flow components result in a substantially uniform flow around all sides of the filter bodies, and in combination with the already mentioned cyclic pressure pulses resulting from the oppositely revolving filter bodies passing one another, act to forestall excessive deposition of sediments on the filter bodies. The flow spoilers 18 are effective to prevent any excessive circumferential flow of the liquid to occur in the peripheral range, which would otherwise result in a reduction of the relative speed between the liquid to be filtered and the filter bodies 8c of the outermost group.

FIG. 10 shows a second embodiment of the connection of oppositely revolving filter bodies to respective hollow shafts. As shown in this figure, two annular pipes 48 and 49 having different radii of curvature are secured to a first tubular radial arm 6, with the latter passing through annular pipe 48 and extending into annular pipe 49. Within annular pipe 48, radial arm 6 is formed with transverse bores (not shown) for establishing communication between the interior of radial arm 6 and annular pipes 48 and 49, the latter being provided with threaded bores 64 for each filter body.

Each filter body comprises a perforated pipe section 54 and a filter medium 55 mounted thereon. Inserted into one end of perforated pipe section 54 and fixedly secured thereto is a plug 66 provided with a collar 65. A threaded stud 67 extending from collar 65 is screwed into a threaded bore 64 of the respective annular pipe, with a sealing washer 68 interposed therebetween. Inserted into the other end of pipe section 54 and fixedly secured thereto is a closure plug 69 having its end projecting from pipe section 54 formed with screw threads engaged by a pair of nuts 70 for securing the filter body to a carrier ring 59 formed with corresponding bores. The same type of mounting is used for the filter bodies 8a secured to annular pipe 48.

In addition to a second group of filter bodies 8b, the embodiment of FIG. 10 includes a fourth group of filter bodies 8d. These two groups of filter bodies are secured to a tubular radial arm 21 extending from second hollow shaft 22. The other ends of filter bodies 8b and 8d are screw-connected to carrier rings 62 and 71, respectively, corresponding to carrier rings 59 and 63. In operation, filter bodies 8a and 8c secured to radial arm 6 revolve in a direction opposite to the revolution of filter bodies 8b and 8d secured to radial arm 21.

Also shown in FIG. 10 is an alternative embodiment of a filter body as illustrated by filter body 8b. It comprises a filter element 89 provided with threaded connections similar to those of filter body 8c, and enclosed in a rigid support sleeve 90 formed with relatively wide apertures 91 affording the liquid to be filtered substantially unrestricted access to filter element 89. This construction is particularly intended for the use of ceramic or similarly fragile filter elements not capable of withstanding laterally acting forces such as the centrifugal forces occurring in operation of the filter apparatus. The rigid support sleeve 90 absorbs these forces and thus protects the filter element 89.

FIG. 10 and the radially sectioned view thereof in FIG. 11 additionally illustrate the mutual bracing of the filter bodies of each group, including a hoop 72 disposed within the circular array of filter bodies of each group so as to engage the inwards facing sides of the filter bodies, optionally with the interposition of a cushioning strip 73 of a soft material therebetween for preventing filter medium 55 from being damaged by hoop 72. The outwards facing sides of the filter bodies are engaged by a clamp ring 74 connected to hoop 72 by tension screws 75 with nuts 76. This arrangement secures the filter bodies against bending outwards under the influence of centrifugal forces caused by their revolution, so that it is possible to employ relatively long and slender filter bodies. If need be, several such hoop and clamp ring arrangements may be provided on a group of filter bodies at locations spaced along the length thereof.

FIG. 12 shows an embodiment of the invention which basically differs from the one illustrated in FIG. 7 by the fact that the filter bodies 8b of the circular array disposed between the outer and inner arrays of filter bodies 8c and 8a, respectively, are secured to a stationary tubular carrier 77 communicating with an outlet 78 for draining the filtrate from filter bodies 8b. This filter apparatus also performs with an acceptable filtering throughput at reduced structural expenditure.

I claim:

1. A filter apparatus comprising a cylindrical casing having an axis, means for pressure-feeding a liquid to be filtered to said casing, at least one rotor mounted concentrically in said casing and coupled to rotary drive means for rotating it about the axis of said casing, said rotor being composed of a hollow shaft rotatably mounted in a first end wall of said casing and having secured thereto a carrier device radially extending from said hollow shaft, and a first plurality of slender tubular filter bodies having two ends each and being disposed in at least one closed circular array concentric with the casing axis, and extending parallel thereto, with one of the ends of said filter bodies secured to said carrier device, said filter bodies including hollow interiors communicating with an interior of said hollow shaft through passages formed in said carrier device, the interior of said hollow shaft communicating with an outlet for filtrate draining from said filter bodies, said filter bodies being of cylindrical configuration, with equal numbers of the filter bodies disposed in each of several concentric circular arrays, the diameters of said filter bodies increasing with the increase of the radius of the circular arrays containing them, so as to obtain substantially equal spacings between adjacent filter bodies.

2. The filter apparatus of claim 1, wherein the ends of all filter bodies facing away from said carrier device are retained by a common carrier disc provided with perforations between said filter bodies and having at its center a hub rotatably mounted on a socket secured in a second casing end wall opposite to the first casing end wall mounting said hollow shaft.

3. The filter apparatus of any of the preceding claims, wherein said casing has a circumferential sidewall having an inner face to which a number of substantially axially extending flow spoilers are secured for preventing the liquid to be filtered from being cicumferentially entrained by the revolving filter bodies of an outermost plurality of filter bodies.

* * * * *